March 3, 1959

D. W. REED 2,875,612

SUBSURFACE FLOWMETER

Filed Dec. 28, 1955

INVENTOR.
DENZEL W. REED
BY

HIS ATTORNEY

March 3, 1959

D. W. REED 2,875,612

SUBSURFACE FLOWMETER

Filed Dec. 28, 1955

INVENTOR.
DENZEL W. REED
BY
HIS ATTORNEY

March 3, 1959
D. W. REED
2,875,612
SUBSURFACE FLOWMETER
Filed Dec. 28, 1955
3 Sheets-Sheet 3
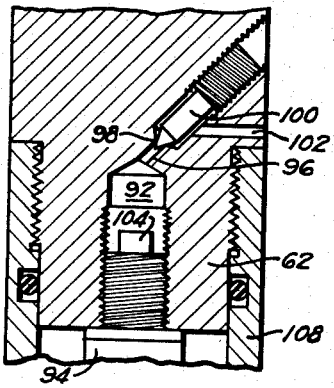
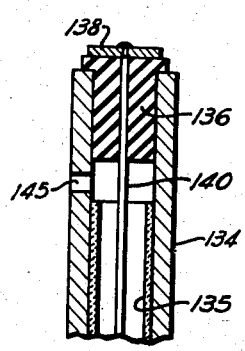
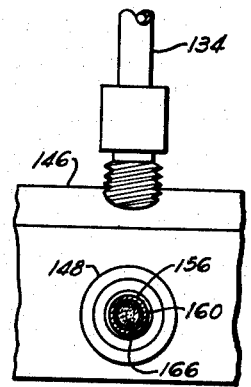
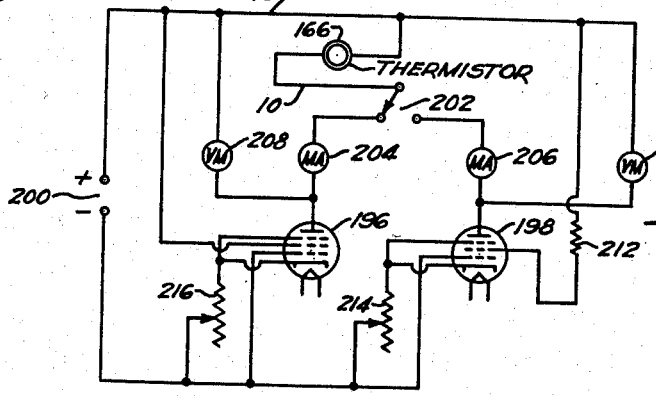
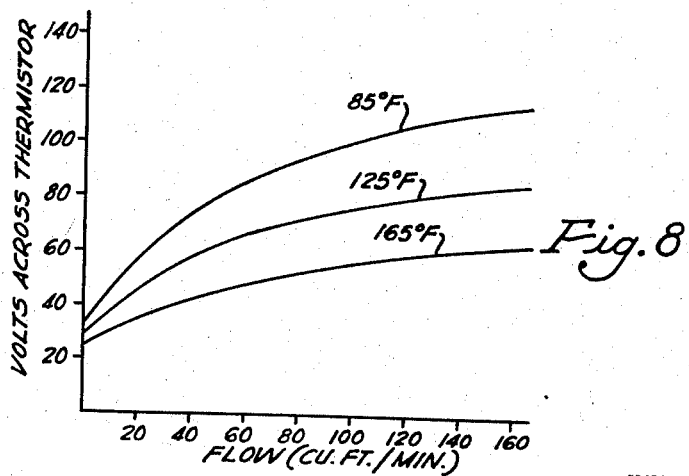
INVENTOR.
DENZEL W. REED
BY
HIS ATTORNEY

2,875,612

SUBSURFACE FLOWMETER

Denzel W. Reed, Allegheny County, Pa., assignor to Gulf Research & Development Company, Pittsburgh, Pa., a corporation of Delaware Application December 28, 1955, Serial No. 555,822

10 Claims. (Cl. 73—155)

This invention relates to apparatus for the measurement of fluid flow and especially adapted for the measurement of liquid flow in wells.

The production of oil or gas by secondary recovery methods is of increasing importance in this country. In secondary recovery operations a liquid or gas is pumped down into a well penetrating producing formations and forces oil from other wells located nearby. Often the well used for pressure maintenance penetrates more than one porous formation and it is desirable for the operator to know the amount of fluid he is pumping into each formation. Similarly, if a well is producing from more than one formation and the producing formations are not separated by means of packers or other equipment in the well it is not possible to determine the production of each zone of the well by measurement of the fluid discharged from the well; hence, a flow measuring device which can be lowered into the well and measure the rate of flow of gases or liquids through the well at different elevations is desirable.

Flow recording devices using thermistors that are cooled by the fluids in the well have been used to measure the rate of flow of fluids at various locations in a well. An example of the devices heretofore available is described in U. S. Patent No. 2,580,182 of Frank Morgan et al. Those devices, although satisfactory for the measurement of the rate of flow of gases, are usually not satisfactory for determining the rate of flow of many well liquids. Well liquids often have high electric conductivities which short-circuit the resistance element and thereby prevent accurate measurement of the rate of flow of the liquid. Moreover, extremely high heat transfer rates, such as are obtained when well liquids flow at high velocities directly in contact with the thermistor, tend to cool the thermistor to a temperature near the temperature of the liquid and thereby impair the sensitivity of the apparatus.

This invention resides in a flowmeter for measuring the flow of liquids and gases at different elevations in wells by determining the change in resistivity of a thermistor positioned in the stream of fluids flowing in the well. The thermistor is enclosed by a shield and is electrically insulated from the well fluids by an insulating liquid between the thermistor and the shield. The insulating liquid is exposed to the pressure of the well fluids, thereby allowing the use of a thin shield of low heat capacity and resistance to heat transfer to provide an instrument of high sensitivity even when the pressure on the well fluids is very high.

In the drawings:

Figure 4 is a fragmentary sectional view of the passages for transmitting the well fluid pressure into the apparatus.

Figure 5 is a vertical sectional view of the upper end of a tube through which the well fluid pressure is transmitted to the thermistor.

Figure 6 is a transverse sectional view across the thermistor taken along section line VI—VI in Figure 2.

Figure 7 is a wiring diagram illustrating a preferred electrical circuit for use with this invention.

Figure 8 illustrates typical calibration curves for the flowmeter.

Figure 1:
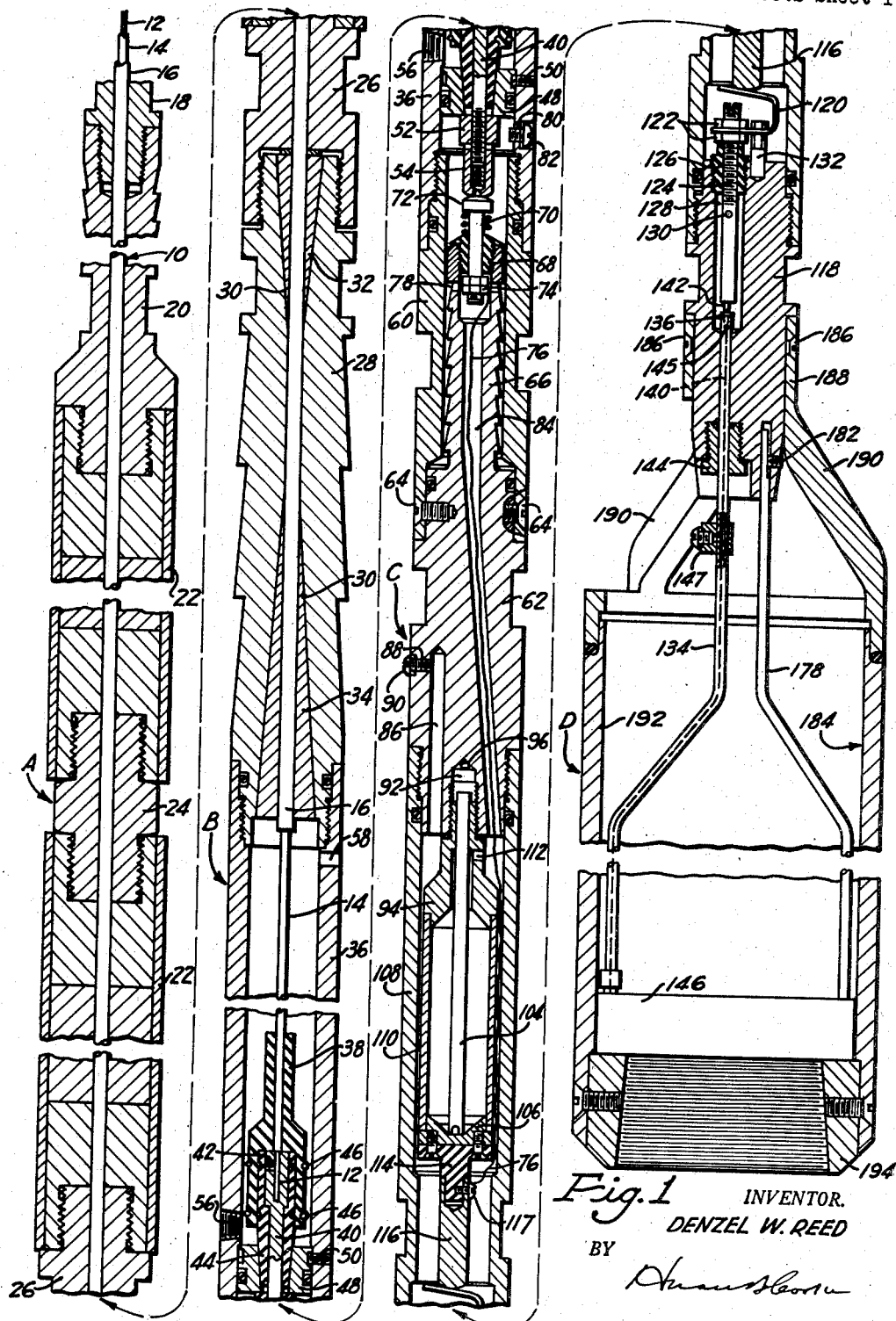
Figure 1 is a longitudinal sectional view, divided into four sections, of a preferred embodiment of a flowmeter constructed according to this invention.

The complete flow measurement apparatus in Figure 1 consists generally of a sinker section A, a lead-in section B, a pressure inlet section C, and a thermistor supporting section D. The thermistor supporting section D includes a cage which directs the well fluids past the thermistor. The apparatus illustrated in Figure 1 of the drawings is supported in the well by a wire line or pipe connections, not shown. The several sections are connected together by threaded connections or set screws. In most instances O-rings or washers are employed at the connections to provide a tight liquid seal.

The term "thermistor" used in this application designates a well known type of resistor having a high temperature coefficient of resistance. Several different types of thermistors are described in United States Patents Nos. 2,373,160; 2,339,029; 2,332,596 and 2,396,196. The characteristics of thermistors making them particularly desirable for use in the flow measurement devices of the type with which this invention is concerned are discussed in detail in the above-mentioned Patent No. 2,580,182.

Referring to Figure 1, an electrically conducting cable 10 extends upwardly to the well head where it is connected to the electric circuit illustrated in Figure 7 of the drawings. Electric cable 10 consists of a central "hot" wire 12 encased in electrically insulating material 14 which is covered by a metal sheath 16. The hot wire 12 is connected with one end of the thermistor and the metal sheath 16 serves as a ground wire, as will become clear from the following description.

A connector 18 from the wire line or pipe stem used to support the flowmeter in the well is screwed into the upper end of a fishing head 20 on the sinker assembly A. The sinker assembly A consists of any desired number of sections 22 joined by connecting members 24. The sections 22 can be sections of pipe filled with lead and tapped and threaded to receive the threads on the connecting members 24. Sections 22 and connecting members 24 have a central opening extending longitudinally through them which allows the electric cable 10 to pass through the sinker assembly. The lowest of the sections 22 is connected to a connector 26 on the upper end of the lead-in assembly B. A lead-in body 28 screwed to the lower end of connector 26 has a central bore 30 extending longitudinally through it through which the cable 10 passes. Central bore 30 is flared at each of its ends to allow the molding of tapered lead plugs 32 and 34 around the electric cable 10 to anchor the cable 10 in the lead-in body 28.

The metal sheath 16 on the outer surface of the electric cable 10 ends at the lower end of the lead plug 34 and the hot wire 12, covered by the insulation 14, extends downwardly through a sleeve 36 screwed to the lower end of the lead-in body 28. A sealing member 38, which may be constructed of synthetic rubber or similar material, is mounted on the lower end of the electric cable 10. The insulation 14 ends within the sealing member 38 and the exposed hot wire 12 extends into a metal conductor 40. A set screw 42 holds the hot wire 12 tightly against the conductor 40. Metal conductor 40 is covered by a tapered insulating and sealing member 44, between the conductor 40 and the sealing member 38, which is held tightly in place by suitable means such as wires 46 around the sealing member 38.

The conductor 40 extends downwardly through a bushing 48 held in place in sleeve 36 by set screw 50. A spacer washer 52 of suitable electrically insulating material is held against the lower surface of the bushing 48 by a metallic cap 54 screwed onto the lower end of the conductor 40.

The sleeve 36 is drilled and tapped at 56 directly above the bushing 48 and also is provided with a port 58 near its upper end. After the device has been assembled, grease or other similar plastic material is forced into the sleeve to fill it. If desired, a screw can be inserted at 56 after filling. In this manner leakage of well fluids into the lead-in assembly is prevented.

A tubular rotary contact housing 60 is connected by means of threads at its upper end to the lower end of the sleeve 36. The housing 60 is secured at its lower end to a pressure inlet body 62 by means of screws 64. A hollow neck 66 of the pressure inlet body 62 extends upwardly into the housing 60 and receives an insulating bushing 68 which provides a base for a helical spring 70. Spring 70 urges an electric contactor 72 upwardly against the cap 54 to continue the electrical circuit into the housing 60. A pair of nuts 74 on the lower end of the contactor 72 below the bushing 68 secures an insulated electrically conducting wire 76 onto the contactor 72. Ports 78 in the neck 66 of the pressure inlet body 62 allow a thermally conducting and electrically insulating liquid to be injected into the housing 60, in the manner hereinafter described. A port 80 in the lower end of the sleeve 36 below the bushing 48 allows complete filling of the system with the thermally conducting and electrically insulating liquid. Port 80 is closed by a screw 82 during use of the flow measuring device.

The pressure inlet body 62 has a duct 84 centrally located at its upper end extending downwardly at an angle toward one side of the pressure inlet body 62. The duct opens at the lower end of the pressure inlet body 62. Insulated wire 76 extends from the nuts 74 down through the duct 84 through the pressure inlet body. Extending upwardly from the lower end of the pressure inlet body 62 is a filling passage 86. The pressure inlet body 62 is drilled and tapped at 88 to provide a filling opening communicating with the passage 86. A screw 90 its in opening 88 to close the system at that point after the system has been filled with an electrically insulating liquid.

A pressure inlet socket 92 extends upwardly into the pressure inlet body 62 from its lower end. The pressure inlet socket 92 is threaded at its lower end to receive a water trap 94. As is best shown in Figure 4, a conduit 96 extends from the upper end of the pressure inlet socket through the pressure inlet body 62. A valve seat 98 in the conduit 96 is engaged by a valve plug 100 which is screwed into the conduit 96. An inlet passage 102 extends from the outer surface of the pressure inlet body 62 to the conduit 96 to transmit the pressure of the well fluids into the apparatus during operation of the flow measurement apparatus. Valve plug 100 is withdrawn to a position out of engagement with valve seat 98 during the operation of the flow measurement apparatus.

Again referring to Figure 1 of the drawings, a tube 104 opens at the upper end of the water trap 94 into the pressure inlet socket 92 and extends downwardly to the lower end of the water trap 94 which is closed by a base plate 106. The tube 104 is open at its lower end. The water trap 94 has an outer diameter smaller than the inner diameter of a water trap shell 108 secured to the lower end of the pressure inlet body 62 and surrounding the water trap to form an annular passage 110 between the water trap and the water trap shell. A port 112 in the upper end of the water trap 94 allows fluids to flow between the water trap into the annular passage 110.

A contact pin support 114 constructed of an insulating material is secured to the base 106 of the water trap. A metallic contact pin 116 is mounted on the lower end of supporting member 114. The insulated wire 76 extends downwardly through the annular passage 110 and is connected to contact pin 116 by any suitable means to complete the circuit from the contactor 72 to the contact pin 116. In the embodiment illustrated in the drawings, the lower end of the wire 76 is secured to pin 116 by means of a screw 117.

A connecting member 118 is provided between the lower end of the water trap shell and the thermistor supporting section D. The connecting member 118 is integral with the thermistor supporting section and is screwed into the lower end of the water trap shell 108. Rotational contact to complete the electrical circuit is provided by a leaf spring contact member 120 which is secured between two nuts 122 on a conducting rod 124. The conducting rod is mounted in an electrically insulating bushing 126 screwed into a socket 128 in the upper end of the connecting member 118. A hole is drilled down through the conducting rod 124 to intersect a transverse opening 130 at a level below the bushing 126. Opening 130 opens into the socket 128 to allow the electrically insulating liquid to be introduced down into the socket 128 below the bushing 126. The leaf spring contact 120 is held in alignment to engage the lower end of the contact pin 116 by a guide arm 132 constructed of an insulating material.

A hollow tube 134, extends upwardly through the lower end of the connecting member 118 into the lower end of the socket 128. Preferably a ceramic tube 135 extends down through tube 134 to provide thermal and electrical insulation for the wire that passes through the tube. As is best shown in Figure 5, the upper end of the tube 134 is closed with a bushing 136 of an insulating material. A metallic disc 138 on the upper surface of bushing 136 is connected to an insulated wire 140 which extends through bushing 136 down into the tube 134. Electric contact between the wire 140, through the disc 138, and the conducting rod 124 is completed by means of a spring contact 142 on the lower end of the conducting rod 124. Tube 134 is held firmly in place in the lower end of the connecting member 118 by a packing gland assembly 144. A hole 145 in tube 134 directly below the lower end of bushing 136 allows fluid from socket 128 to enter tube 134. A bleed-off plug 147 on the tube 134 facilitates removing air from the system.

Figure 2:
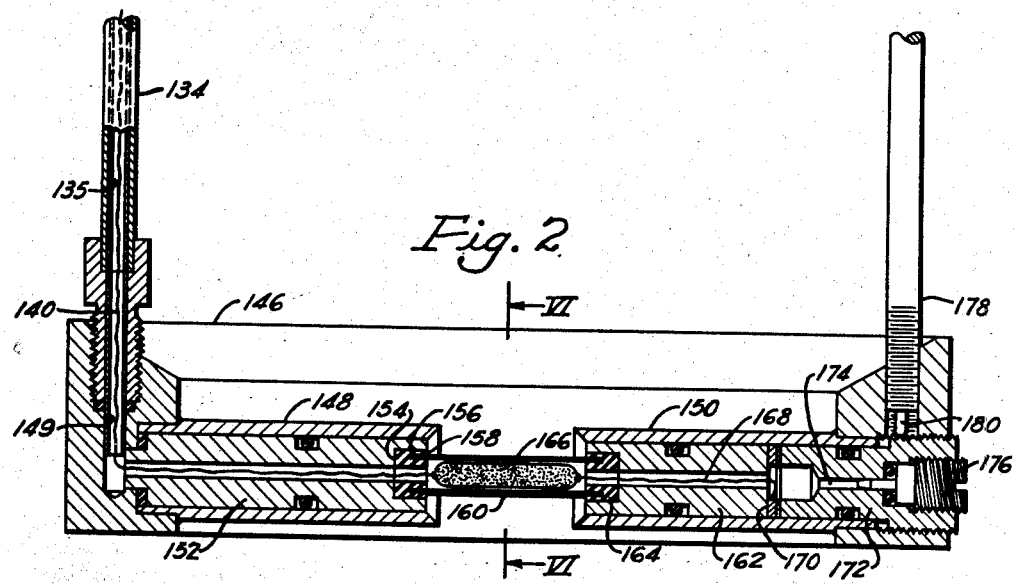
Figure 2 is a vertical sectional view taken longitudinally through the thermistor and its supporting structure in the flowmeter.
Figure 3:
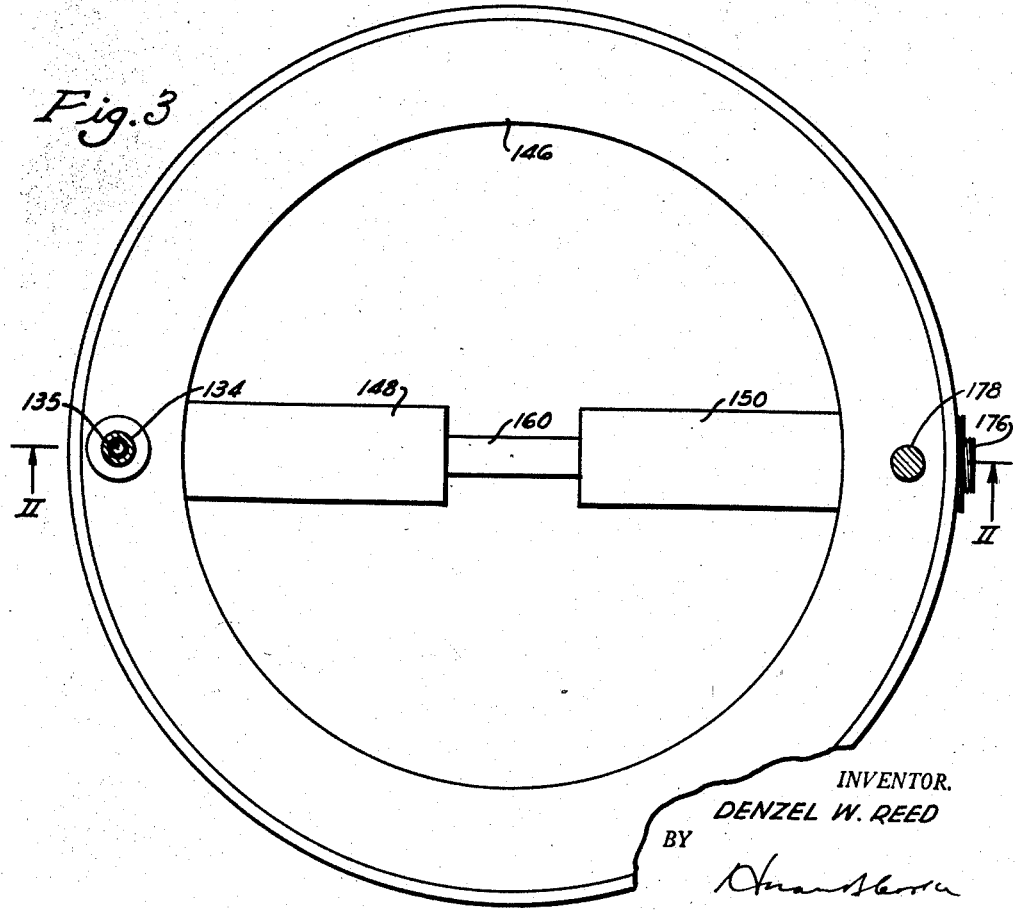
Figure 3 is a plan view of the assembly for supporting the thermistor in the stream of well fluids.

Tube 134 extends downwardly to the upper surface of a thermistor supporting ring 146. As is best shown in Figure 2 of the drawings, ring 146 is drilled and tapped to receive the lower end of the tube and permit the conducting wire 140 to pass downwardly into the ring. It is preferred that the opening in the ring 146 be lined with thin ceramic insulating tubes 149 to protect the wire 140. A pair of hollow tubular supports 148 and 150 are secured to the inner surface of the ring at diametrically opposed positions to provide supports for the thermistor. The ring 146 is drilled horizontally to provide a passage allowing the conducting wire 140 to extend horizontally into the support 148. A tubular insulator 152, of suitable material, such as Teflon, in the support 148 has a shoulder 154 on which an insulating washer 156 rests. The insulating washer is slotted 158 in its outer end to receive a thin metallic shield 160. A similar arrangement of insulator 162 and washer 164 is provided in support 150.

The conducting wire 140 passes through the insulator 152 and washer 156 and is connected to a thermistor 166 positioned in the shield 160. A conducting wire 168 continues the circuit from the end of the thermistor 166 opposite the end to which wire 140 is connected to a metallic washer 170 engaging support 150 and thereby providing a ground for the electric circuit.

An adjusting member 172 is slidable in the supporting member 150 to permit compression of the shield 160 to provide a tight seal preventing admission of well fluids around the ends of the shield. The position of adjusting member 172 can be changed by means of threads on its outer surface which engage threads in the ring 146. Adjusting member 172 has a passage 174 through it to allow air to be bled from the system when the system is filled with the electrically insulating liquid. The passage 174 is closed by a plug 176 screwed into the end of the adjusting member 172 after the system is filled with liquid.

A ground rod 178 is threaded into the ring 146 and extends upwardly to the lower end of the connecting member 118. Ground rod 178 has a finger 180 on its lower end which engages the adjusting member 172 to lock it in place. A set screw 182 secures the upper end of the ground rod 178 in the connecting member 118 in the manner illustrated in Figure 1. The ground connection is completed through the connecting member 118, water trap shell 108, pressure inlet body 62, housing 60, sleeve 36, lead-in body 28, and sheath 16.

Again referring to Figure 1, a cage 184 is secured to the lower end of the connecting member 118 by set screws 186 extending through an upper supporting ring 188 of the cage. Cage 184 is constructed to direct the fluids in the well through the ring 146 and past the shield 160 around the thermistor. A number of spaced arms 190 joining the upper supporting ring 188 and a lower tubular section 192 of the cage provide openings through which the well fluids flow. A collar 194 is secured at the lower end of the tubular section 192 to provide support for the ring 146. In apparatus to be installed in two inch tubing, the tubular section may be, for example, a section of 1½ inch pipe.

The shield 160 is extremely thin walled to reduce its heat capacity and resistance to heat transmission. For example, the shield may be constructed of stainless steel and have a wall thickness of about 0.005 inch. As shown in Figure 2, the inner diameter of the shield is slightly greater than the outer diameter of the thermistor 166. The space between the thermistor and the shield is filled by the thermally conducting liquid in the matter hereinafter described.

The flow measurement apparatus of this invention is prepared for use by assembling the several sections in the manner illustrated in Figure 1. After assembly, the space within the sleeve 36 is filled with suitable material of a grease-like consistency. The screw at 56 is then replaced but the port 58 is left open to allow the well fluids to exert pressure on the grease-like mass within sleeve 36. The next step is to remove the screw 90 to open port 88 in pressure inlet body 62. The screw 82 at the top of the pressure inlet assembly and the plug 176 in the thermistor supporting ring 146 are removed.

A thermally conducting and electrically insulating liquid of a substantially inert character, for example a silicone oil, is introduced into the system through the port 88. The thermal conductivity of the liquid is a secondary consideration because the film of liquid between the thermistor and the shield is extremely thin. The principal purpose of the liquid is to transmit well pressure to the inner surface of the shield, and thereby maintain the same pressure on its inner and outer surfaces to permit use of a very thin-walled shield, and to electrically insulate the thermistor from the shield. Any liquid of low electrical conductivity and low solubility in oil can be used. The liquid passes downwardly through the water trap shell and through the hole 130 in the conducting rod 124. The liquid is discharged from hole 130 into socket 128 and passes downwardly in the socket and through hole 145 into the tube 134. The liquid continues down through the tube and the insulator 152, around the thermistor 166, through the insulator 162 and bushing 172. Addition of the liquid to the system is continued until a steady stream of liquid is discharged from the passage 174, whereupon the plug 176 is replaced.

Continued addition of the liquid fills the space 110 between the water trap shell 108 and the water trap 94 and causes the liquid to flow through the bore 84 and the space within the housing 60, up to the opening 80. The liquid also flows into the water trap 94, displacing air from it. The liquid flows up the tube 104 into the socket 92 and through the open valve to opening 102. When all of the air has been removed from the system the screw 82 is replaced to close the opening 80 and the valve plug 100 is moved into engagement with the valve seat 98 to put the apparatus in condition for shipping. Before lowering the apparatus into the well, the valve plug 100 is withdrawn from engagement with the valve seat to allow the well fluids to exert the well pressure on the liquid filling the system.

The electrical circuit illustrated in Figure 7 of the drawings is adapted to supply either one of two constant currents to the thermistor 166. Any circuit of suitable design to pass a constant current through the thermistor and allow measurement of the resistivity of the thermistor can be used. In the embodiment illustrated in Figure 7, multi-element tubes supply the constant current. The high resistance of the thermistor makes the resistance of the lead lines negligible and allows substantially all of the electric circuit illustrated in Figure 7 to remain in the well head. Only the electric cable, wires, and thermistor shown in Figure 1 are lowered into the well.

A pair of indirectly heated multi-element electronic tubes 196 and 198 are connected across a voltage source 200. A double throw switch 202 is provided to allow the thermistor to be placed in the circuit of either one of the tubes. Milliammeters 204 and 206 indicate the current flowing through the thermistor, and voltmeters 208 and 210 indicate the voltage across the thermistor. The resistivity can be determined from the readings on the voltmeters and milliammeters. If desired, the voltmeters may be of the recording type. Resistances 212 and 214 provide control of the current passing through tube 198 and resistance 216 of the current through tube 196. In a circuit operating on a voltage supply at source 200 of 250 volts, the resistances 212, 214 and 216 may be, for example, of the order of 200,000, 70,000 and 1000 ohms respectively.

The extent of cooling of the thermistor obviously will depend on the temperature of the well fluids as well as the flow rate. It is necessary, therefore, to calibrate the apparatus for different well fluid temperatures. The calibration can be accomplished by passing fluids similar to the well fluids through a tubing, of the size with which the apparatus is used and in which the flow measurement apparatus is installed, at different known temperatures and flow rates. A series of curves showing the change in resistivity at a given temperature of the well fluids for different flow rates can then be prepared. A typical set of calibration curves is illustrated in Figure 8 of the drawings. In actual use of the flow measurement device, the voltage drop across the thermistor is used directly as an indication of the flow rate. The calibration is described in greater detail in U. S. Patent No. 2,580,182, mentioned above.

The circuit including tube 198 is designed to pass a very low current, of the order of 0.2 milliampere or less, through the thermistor. That current is not sufficient to provide substantial heating effect but does cause sufficient voltage drop, which is measured by voltmeter 210, to allow the resistivity of the thermistor to be determined. When in the circuit including tube 198, the thermistor will be at substantially the temperature of the well fluids. Thus, the circuit including tube 198 provides means for measuring the temperature in the well.

After the temperature has been determined the switch 202 is thrown to place the tube 196 in the circuit with the thermistor. The constant current flowing through tube 196 is of the order of 20 milliamperes and therefore provides a substantial heating effect which allows the flow past the thermistor to be determined by measurement of the resistivity of the thermistor. For example, the circuit including tube 196 may heat the thermistor to a temperature above 500° F. The temperature of the fluids in the well will ordinarily be substantially lower, for example below about 350° F. and generally below about 200° F. The well fluids, therefore, exert a substantial cooling effect upon the thermistor, allowing accurate measurement of the rate of flow. The resistivity of the thermistor is measured by the voltmeter 208 since the current through the thermistor is constant. Once the temperature of the well fluids and the voltage across the thermistor are known, the flow rate can be determined from the calibration curve.

The thermistor in the flow measuring device of this invention is electrically insulated from the well fluids; hence, cannot be short circuited by the fluids. The thin film of silicone oil and the very thin shield covering the thermistor have low heat capacities. Exposing both the inside and outside of the shield to the pressure of the well fluids eliminates a net pressure on the shield and permits the use of a shield having an extremely thin wall.

I claim:

1. In a flowmeter of the type in which an electric current is passed through a thermistor, a voltmeter is connected across the thermistor to measure its resistivity, and the rate of flow of fluids is determined by the change in resistivity of a thermistor caused by a change in temperature of the thermistor with a change in the rate of flow, the improvement comprising a thermistor adapted to be supported in the fluids the flow of which is to be measured, electric leads connected to the thermistor for connecting the voltmeter across the thermistor, a shield of low heat capacity and resistance to heat transfer enclosing the thermistor, an electrically insulating liquid in the shield between the thermistor and the shield, and a pressure inlet passage communicating with the electrically insulating liquid within the shield and the fluids the rate of flow of which is to be determined.

2. A flowmeter adapted to be lowered into a well to determine the rate of flow of fluids at a desired level in the well comprising a thermistor, means for supporting the thermistor in the fluids flowing in the well, a shield, of low heat capacity and resistance to heat transfer enclosing the thermistor to prevent well fluids coming in contact with the thermistor, a substantially inert, electrically insulating liquid filling the shield, a restricted passage communicating with the space within the shield and the well fluids constructed and arranged to transmit the pressure of the well fluids to the inert electrically insulating liquid, a voltage source, an electrical circuit connected from the voltage source adapted to pass a constant current through the thermistor, and a voltmeter connected across the thermistor.

3. Apparatus for the measurement of flow of fluids in a well, said apparatus being adapted to be lowered into the well and comprising a thermistor, means for supporting the thermistor in the stream of fluids flowing through the well, an electric circuit adapted to pass a constant current through the thermistor, means for measuring the voltage drop across the thermistor, a metallic shield enclosing the thermistor to prevent contact of the well fluids with the thermistor, an inert electrically insulating liquid in the shield separating the shield from the thermistor, a filling passage in the supporting means for introducing the inert liquid into the shield, venting means positioned to remove air from the shield and supporting means during filling of the shield with the inert liquid to allow complete filling of the means for supporting the thermistor and the shield, means for closing the filling means and venting means, and a restricted passage communicating with the well fluids and the substantially inert liquid for transmission of the pressure of the well fluids to the substantially inert liquid.

4. Apparatus adapted to be lowered into a well for the measurement of the rate of flow of fluids in the well comprising a pressure inlet body, a tube extending downwardly from the pressure inlet body to a supporting ring, means for directing well fluids the rate of flow of which is to be measured through the ring, a first tubular support extending inwardly from the inner surface of the ring, a second tubular support extending inwardly from the inner surface of the ring toward the first support and having its inner end spaced from the inner end of the first support, a passage in the ring adapted to allow flow from the tube to the first tubular support, insulating means in the supports, a tubular shield extending across the space between the ends of the supports and engaging the insulating means to prevent flow of well fluids into the shield, a thermistor positioned within the shield, an electrically conducting wire extending from the pressure inlet body downwardly through the tube, ring, and insulator to one end of the thermistor, means connecting a point on the thermistor spaced from the connection of the electrically conducting wire and the thermistor to a ground, a voltmeter connected to the electrically conducting wire and a ground to measure the resistivity of the thermistor, a pressure inlet port in the pressure inlet body, a passage within the pressure inlet body between the pressure inlet port and the tube to allow transmission of pressure from outside of the pressure inlet body into the tube, through the passage in the ring and insulating means to the shield, and a substantially inert electrically insulating liquid in the shield, insulator tube and pressure inlet body adapted to transmit the pressure of the well fluids to the inner surface of the shield.

5. Apparatus as set forth in claim 4 having adjustable means within one of the supports adapted to compress the ends of the shield against the insulating means to seal the ends thereof.

6. Apparatus as set forth in claim 4 in which a water trap is positioned within the pressure inlet body, a water trap tube from the pressure inlet port into the water trap, said water trap tube terminating within the water trap near the lower end thereof, and a port in the water trap above the lower end of the tube communicating with the passage within the pressure inlet body.

7. Apparatus as set forth in claim 4 in which the substantially inert liquid is a silicone oil.

8. Apparatus for the measurement of the rate of flow of fluids in wells and adapted to be lowered into the well comprising a thermistor, means for supporting the thermistor in the stream of fluids in the well, a thin metallic shield of low heat capacity and resistance to heat transfer enclosing the thermistor, a substantially inert electrically insulating liquid filling the shield and insulating the thermistor therefrom, a restricted passage adapted to transmit the pressure of the well fluids to the substantially inert electrically insulating liquid whereby the pressures on the inner and outer surface of the shield are substantially the same, a first electric circuit adapted to pass a small, constant current through the thermistor, means for measuring the voltage drop across the thermistor when the small current is passing therethrough to determine the temperature of the well fluids, a second electric circuit adapted to pass a large constant current through the thermistor to heat the thermistor to a high temperature, means for measuring the voltage drop across the thermistor when the large current is flowing therethrough, and switching means connected to place the thermistor selectivity in either the first or second electric circuit.

9. Apparatus as set forth in claim 8 in which the shield is constructed of stainless steel and has a wall thickness of the order of about 0.005 inch.

10. In a flowmeter of the type in which a thermistor is supported in the path of the fluids the flow of which is to be measured, an electric current is passed through the thermistor, lead lines connect the thermistor with a voltmeter for measurement of the voltage drop across the thermistor to indicate the rate of flow of the fluids by the change in resistivity of the thermistor caused by the change in its temperature with the change in the rate of flow, the improvement comprising a shield of low heat capacity and resistance to heat transfer enclosing the thermistor, an electric insulating liquid between the thermistor and the shield, and a pressure inlet passage communicating with the electric insulating liquid within the shield and the fluids the rate of flow of which is to be determined.

References Cited in the file of this patent

UNITED STATES PATENTS

| | | |
|---|---|---|
| 2,036,458 | Carlson | Apr. 7, 1936 |
| 2,580,182 | Morgan et al. | Dec. 25, 1951 |
| 2,699,675 | Buck et al. | Jan. 18, 1955 |
| 2,799,758 | Hutchins | July 16, 1957 |